Jan. 31, 1928.
L. ORLAND
1,657,894
PHOTOGRAPHIC CAMERA
Filed June 21, 1926   2 Sheets-Sheet 1
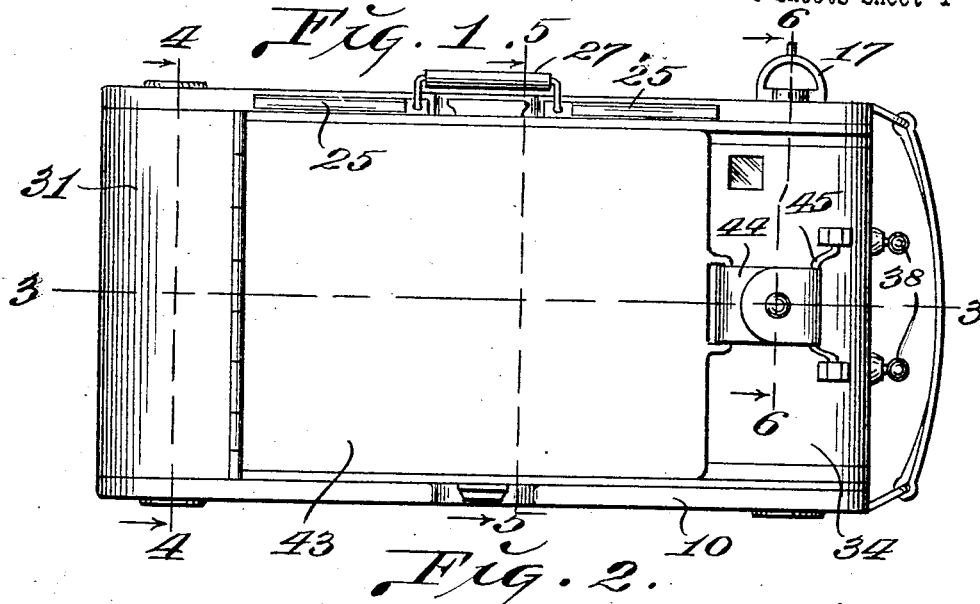
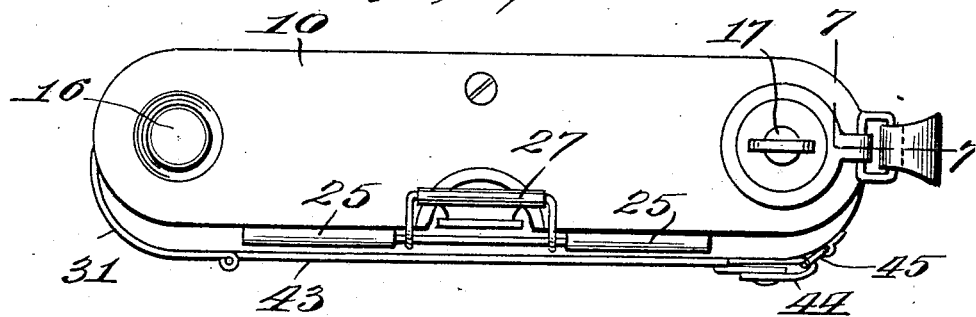
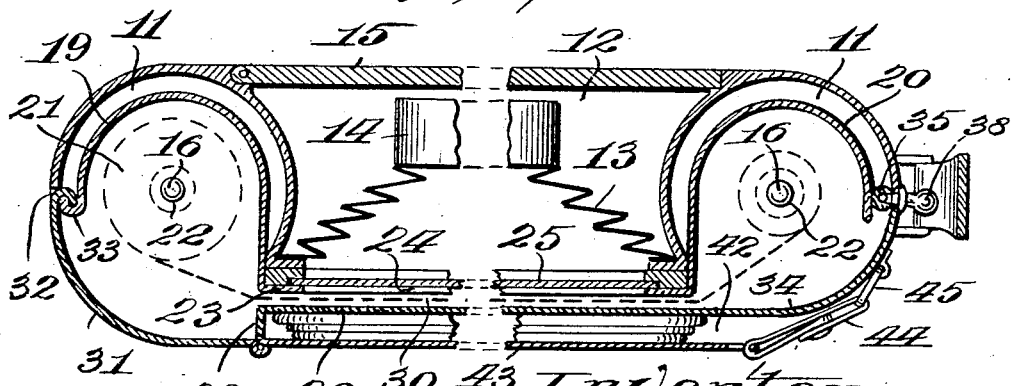
Inventor:—
Louis Orland.
By Martin Pruitt atty Jan. 31, 1928.
L. ORLAND
1,657,894
PHOTOGRAPHIC CAMERA
Filed June 21, 1926     2 Sheets-Sheet 2
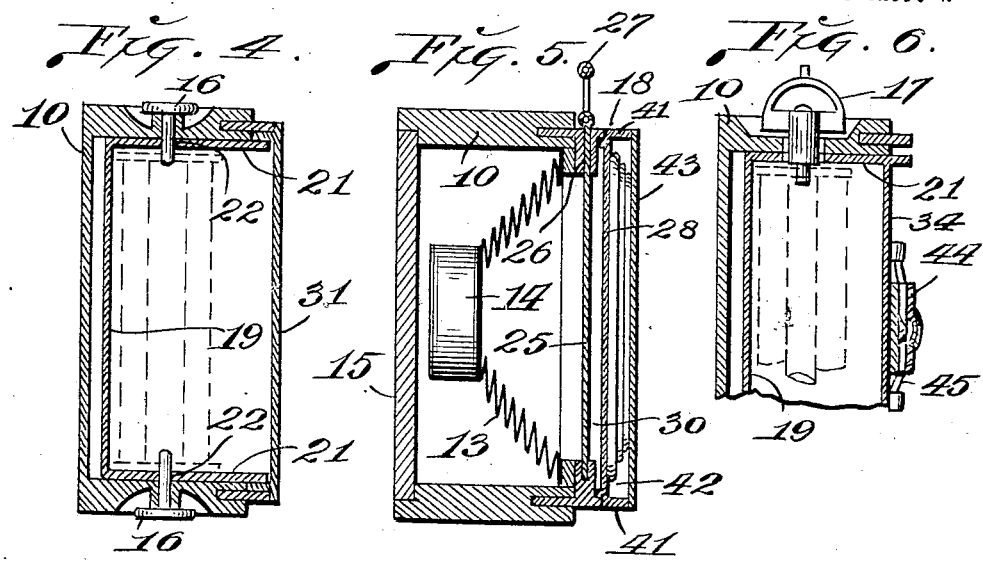
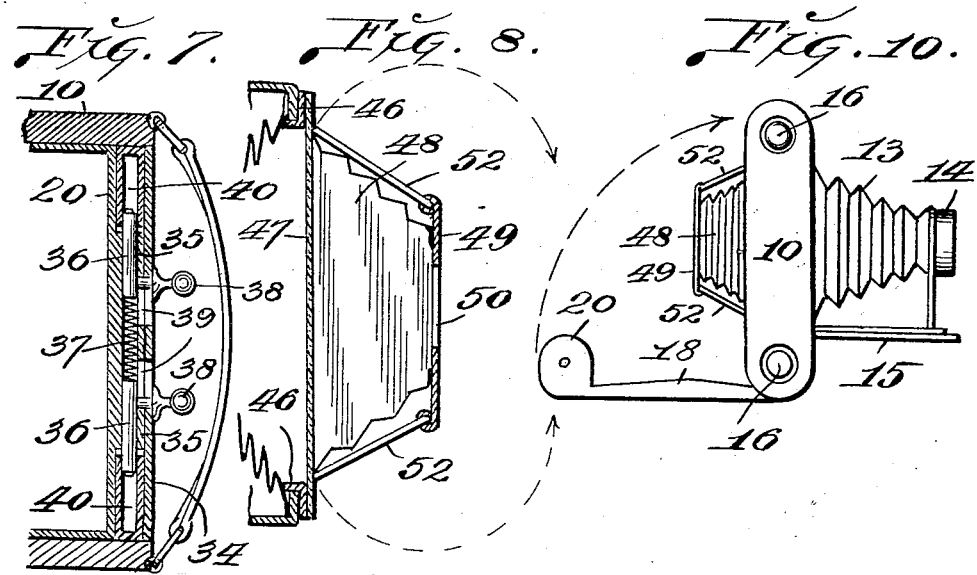
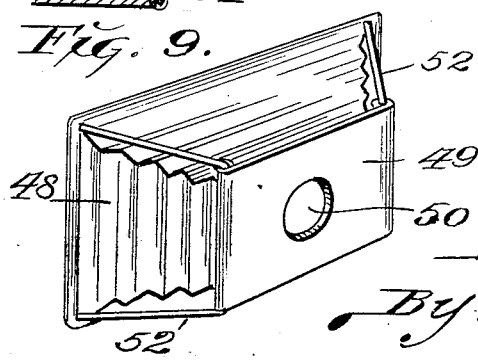
Inventor
Louis Orland.
By Martin C. Smith atty.

Patented Jan. 31, 1928.

1,657,894

UNITED STATES PATENT OFFICE.

LOUIS ORLAND, OF LOS ANGELES, CALIFORNIA.

PHOTOGRAPHIC CAMERA.

Application filed June 21, 1926. Serial No. 117,218.

My invention relates to photographic cameras of the portable or so-called "pocket" type that are now generally used for taking snap shots, and the principal object of my invention is to provide a camera of the type referred to with a relatively simple, practical attachment that will enable the user of the camera to obtain a proper focus of the camera and its lens upon the object or scene that is being photographed, thus insuring accurate and definite detail in the negatives and the photographic prints that are made therefrom.

It very frequently happens that the user of a hand or pocket camera desires to make portrait pictures and the like that require sharpness and detail, and to this end I propose to provide a camera with a focus attachment including a ground glass or its equivalent, and which attachment while not in use is compactly folded into a relatively narrow space or pocket on the back of the camera, and said focusing device being capable of ready application to the camera when it is desired to focus the same and the lens thereof upon the object or scene that is being photographed.

A further object of my invention is to construct the focusing attachment so that it in nowise interferes with the ready operation and use of the camera while the same is being used for taking snap shot pictures.

With the foregoing and other objects in view, my invention consists in certain novel features of construction and arrangement of parts that will hereinafter be more fully described and claimed and illustrated in the accompanying drawings, in which—

Fig. 1 is a rear elevational view of a camera and showing the same equipped with a focusing attachment of my improved construction.

Fig. 2 is a plan view of the camera with the attachment thereon.

Fig. 3 is an enlarged horizontal section taken on the line 3—3 of Fig. 1.

Fig. 4 is a cross section taken on the line 4—4 of Fig. 1.

Fig. 5 is a cross section taken on the line 5—5 of Fig. 1.

Fig. 6 is a detail cross section taken on the line 6—6 of Fig. 1.

Fig. 7 is a vertical section taken on the line 7—7 of Fig. 2.

Fig. 8 is a vertical section taken at a central point on the rear portion of the camera housing and showing the focusing attachment in position for use thereon.

Fig. 9 is a perspective view of the focusing attachment.

Fig. 10 is an elevational view of a camera equipped with my improved focusing attachment and which camera is open and ready for use.

Referring by numerals to the accompanying drawings, 10 designates the housing of an ordinary hand or snap shot camera, which housing is provided at its ends with the usual chambers 11 that accommodate the cartridge or roll of films on which the negatives are made and between said chambers 11 is a larger chamber 12 that is occupied by the usual bellows 13, lens barrel or housing 14, shutter mechanism (not shown) and the usual parts that are associated therewith. The lens barrel and shutter mechanism are arranged in the usual manner for sliding movement upon a hinged panel 15 that constitutes a closure for the chamber 12.

Arranged in the top and bottom walls of the housing 10 and adapted to project into the chambers 11 and serve as bearings for the film-holding spools are the usual pintles 16, one of which is provided on its outer end with a hinged or pivoted handle 17 and which latter is engaged when the film is unwound from one spool and wound onto the other.

My improved focusing attachment includes a housing that is formed of thin sheet material, preferably metal, and said housing includes a relatively narrow intermediate portion 18 that serves as a closure for the rear central portion of the housing 10 and projecting forwardly from the intermediate portion of the housing 18 are substantially tubular end housings 19 and 20 that are adapted to occupy the chambers 11 in the camera housing 10 and which housings 19 and 20 function as containers for the film-carrying cartridges, the latter being shown by dotted lines in Figs. 3, 4 and 6.

The tubular end housings 19 and 20 are each provided with end walls 21 which normally occupy positions immediately against the inner faces of the corresponding walls of the camera housing 10, and said end walls 21 are provided with apertures 22 for the accommodation of the inner portions of the pintles or film-supporting members 16. Thus the pintles 16 that engage the end walls of housing 19 provide a bearing or axis upon which the housing comprising the parts 18, 19 and 20, may be swung outwardly from or toward the camera housing 10 while the focusing attachment is being manipulated.

Housing 18 includes an inner wall 23 in the center of which is formed a relatively large opening 24 that is directly opposite the chamber within the rear portion of the bellows 13 and normally closing this opening 24 is an opaque plate 25 that is adapted to slide through a slot 26 that is formed in the top of housing 18 and pivotally connected to the upper edge of said plate 25 is a handle 27 by means of which said plate is manipulated during its insertion and removal.

Arranged immediately to the rear of wall 23 and parallel therewith is a wall 28, the left hand end of which is bent rearwardly to form a short end wall 29 that occupies a position in alignment with the inner portion of the wall of housing 19 and the right hand end of this plate 28 is bent forwardly to meet the corresponding end wall of the camera housing 10 that encloses the right hand one of the end chambers 11. The relatively narrow space 30 between the walls 23 and 28 provides a chamber through which the photographic film may pass as it is being unwound from the spool within housing 19 onto the spool within housing 20, and thus it will be seen that the film passes directly behind the opening 24 in said plate 23, and which opening is normally closed by sliding plate 25.

From the outer end of the end wall 29, wall 28 extends inwardly on a curve as designated by 31 to conform with the rounded end of the camera housing and the forward end of this curved end wall 31 is bent inwardly to form a hook 32 that engages in a corresponding hook 33 that is formed on the left hand edge of tubular housing 19. It will be understood that wall 28, end wall 29, and the curved end portion 31 are not formed integral with or fixed to the inner parts 23, 19 and 20 of the attachment, but they constitute a swinging outer wall or closure for the attachment.

The right hand end of wall 18 is curved forwardly as designated by 34 to correspond with the rounded end portion of the camera body and the end of said curved end portion 34 is adapted to abut or overlie the corresponding rounded end portion of the camera housing 10, and which latter portion partially encloses the chamber that is occupied by housing 20.

In order to lock the curved end of plate 30 to the adjacent end of the camera housing, a tubular member 35 is integrally connected to the intermediate portion of the outer end of the wall of housing 20 and arranged for sliding movement in the end portions of this tubular member are latch pins 36 that are forced apart by a spring 37. Connected to the inner portions of the pins 36 are the inner ends of small knobs 38, which latter project outwardly through slots 39 that are formed in the tubular member 35 and through the overlying portion of wall 34. The outer ends of these pins 36 are adapted to enter the inner ends of sockets or tubular members 40 that are secured to the overlying end portion of the curved wall 34.

As a result of the construction just described, the outer wall of the focusing attachment housing, and which outer wall comprises the parts 28, 29, 31, and 34, may be securely locked to the inner portion of the focusing attachment housing, and when so locked the outer ends of pins 36 engage in sockets 40 as illustrated in Fig. 7.

When the knobs 38 are pressed toward each other, the pins 36 are withdrawn from the ends of sockets 40 and the outer wall of the focusing attachment housing may now be swung outward away from the inner portion of the housing, and which action is taken when an exposed roll of film is removed from the attachment and an unexposed roll positioned within said housing. During the swinging movement of the outer wall of the focusing attachment housing as just described, the hook member 32 on said outer wall swings on the hook member 33 that is formed on housing member 19.

When the entire attachment is swung outward away from the camera housing to enable the focusing attachment to be used, the pintles 16 that secure the right hand end of the attachment housing to the camera housing are withdrawn and said attachment housing may now be swung outwardly into a position substantially at right angles to the camera housing, during which action the pintles 16 that engage the end housing 19 of the attachment form an axis upon which said attachment housing swings.

Projecting outwardly from the upper and lower edges of wall 30 are relatively narrow walls 41, thereby forming a relatively narrow pocket 42 on the outer face of said wall 30 and to the right hand of end wall 29 and this pocket is adapted to be occupied by the hood member of the focusing attachment while said hood member is not in use, and hinged to the outer end of end wall 29 is the left hand end of a pocket cover plate 43. The right hand end of this cover plate is detachably secured in any suitable manner to the curved end wall 34, preferably by means of a strap 44 that engages a ring 45 on said curved end wall 34.

The hood attachment contemplated by my invention includes a substantially rectangular frame 46 that is preferably formed of light angle bars arranged so that their outwardly presented flanges will fit snugly in the opening into the camera housing at the large end of the bellows 13 and secured to said frame is a section 47 of ground glass or analogous material that provides a focusing field.

Secured to frame 46 and overlying the outer face of the ground glass 47 is a bellows 48 of flexible light-proof material and carried by the outer portion of this bellows is a small rectangular plate 49 in the center of which is formed an opening 50. The ends of plate 49 are looped around the intermediate portions of U-shaped members 52, the end portions of said members forming legs, which, when the device is opened rest upon the end portions of the bellows and frame 46 as illustrated in Figs. 8 and 9 thereby holding the bellows expanded and with the perforated plate 49 spaced apart from the ground glass. Under normal conditions, or while the hood member is not in use, it is folded into a compact condition and stored in the narrow pocket 42 that is formed between wall 28 and cover plate 43.

To prepare my improved attachment for use, a roll of film is arranged in housing 19 and the end of said film is extended through slot 30 and engaged upon the spool that is contained in housing 20. The film is thus placed in the attachment while the outer wall thereof comprising the parts 28, 31 and 34, are swung outwardly away from the inner part and which latter movement may be effected by pressing knobs 38 toward each other so as to disengage pins 36 from the sockets 40. When the outer part of the housing is closed against the inner part and secured in closed position by the engagement of pins 36 in the sockets 40, the housing containing the roll of film is applied to the housing 10 of the camera with the end housings 19 and 20 occupying the chambers 11 in the camera body and the various bearing pintles 16 are inserted through the respective openings and engage the ends of the spools that carry the film.

In taking snap shots, the door or panel 15 on the front of the camera is swung outward in the usual manner and the bellows 13 carrying the lens and shutter 14 is drawn outward to the proper position, after which the operator engages handle 27 and withdraws plate 25, thus uncovering that portion of the film that overlies the opening 24. After the shutter has been operated in the usual manner, plate 25 is reinserted to close opening 24 and the exposed section of the film is now wound onto the spool within housing 20 by engaging and manipulating handle 17 in the usual manner.

To focus the camera upon an object or scene, the folding hood that is packed in pocket 42 is brought into use and this is done by detaching strap 44 to permit cover plate 43 to be swung outward and the hood to be removed from its pocket. Plate 49 is drawn away from the frame 46 and ground glass 47, thereby expanding the bellows 48 and to retain the parts in their open expanded condition, the leg members of the parts 52 are swung inward so that the ends of the legs rest on the end portions of the frame 46 as illustrated in Figs. 8 and 9.

Knobs 38 are now manipulated to release pins 36 from the sockets 40, thereby permitting the attachment housing to be swung outward away from the camera housing into the position as illustrated in Fig. 10 and in order that this movement of the attachment housing may be effected, it is necessary to disengage the pintles 16 that occupy the end walls of housing 20 and during the swinging movement the attachment housing swings on the axis formed by the pintles that engage the end housing 19.

After the attachment housing has been swung away from the camera housing, the inwardly projecting flanges on frame 46 of the hood are inserted in the opening at the larger end of the bellows 13 and the support carrying the lens and shutter 14 may now be moved outward and adjusted to the desired position and during such adjustment the operator views the reproduction of the object or scene that is being photographed and which is thrown onto the ground glass 47 by the camera lens and which view is obtained through opening 50.

After the lens has been adjusted so as to produce clear definition of the object or view upon the ground glass, the operator removes the hood, swings the attachment housing back into position within the camera body and then withdraws plate 25 and operates the shutter so as to make the exposure on that portion of the film that overlies opening 24.

Thus with my improved attachment it is possible to use the ordinary hand or portable camera for taking snap shots, and for taking portraits or views where it is necessary to focus the camera in order to obtain detail and sharp definition of lights and shadows.

Where my improved attachment is applied to cameras already in use, said attachment will be constructed substantially as herein illustrated and described, but where new cameras are manufactured and equipped with the attachment, the left hand portion of housing 19 may be permanently connected to the left hand end of the camera body by a hinge that will permit the attachment to be swung outward into a position substantially at right angles to the plane occupied by the camera body.

It will be understood that minor changes in the size, form and construction of the various parts of my improved attachment may be made and substituted for those herein shown and described without departing from the spirit of my invention, the scope of which is set forth in the appended claims.

I claim as my invention:

1. The combination with a camera body provided in its ends with pockets, of a housing detachably connected to the camera body, which housing comprises a narrow intermediate portion and substantially cylindrical end portions that are adapted to occupy the pockets in the end of the camera body, which cylindrical end portions are adapted to receive film-carrying spools, the outer wall of which housing is hinged at one end to the inner wall thereof, the hinged outer wall of said housing being provided with a pocket a hinged cover for said pocket and a bodily removable collapsible focusing hood adapted to occupy said pocket.

2. An attachment for hand cameras comprising a housing having enlarged end portions that are adapted to contain film-carrying spools, the outer wall of the housing being hinged at one end to the inner wall, there being an opening formed in the inner wall of said housing between the enlarged end portions thereof, a sliding plate normally closing said opening, there being a shallow pocket formed in the outer wall of said housing, a hinged cover plate for said pocket and a bodily removable collapsible focusing hood normally occupying said pocket.

In testimony whereof I affix my signature.

LOUIS ORLAND.